Feb. 16, 1932. V. G. APPLE 1,845,116
METHOD OF INSULATING COILS
Original Filed April 19, 1929
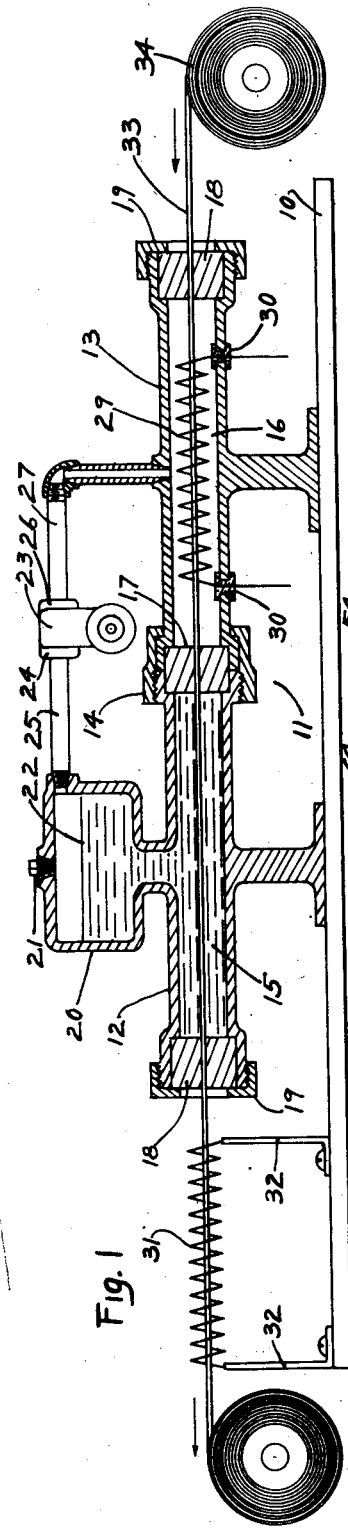
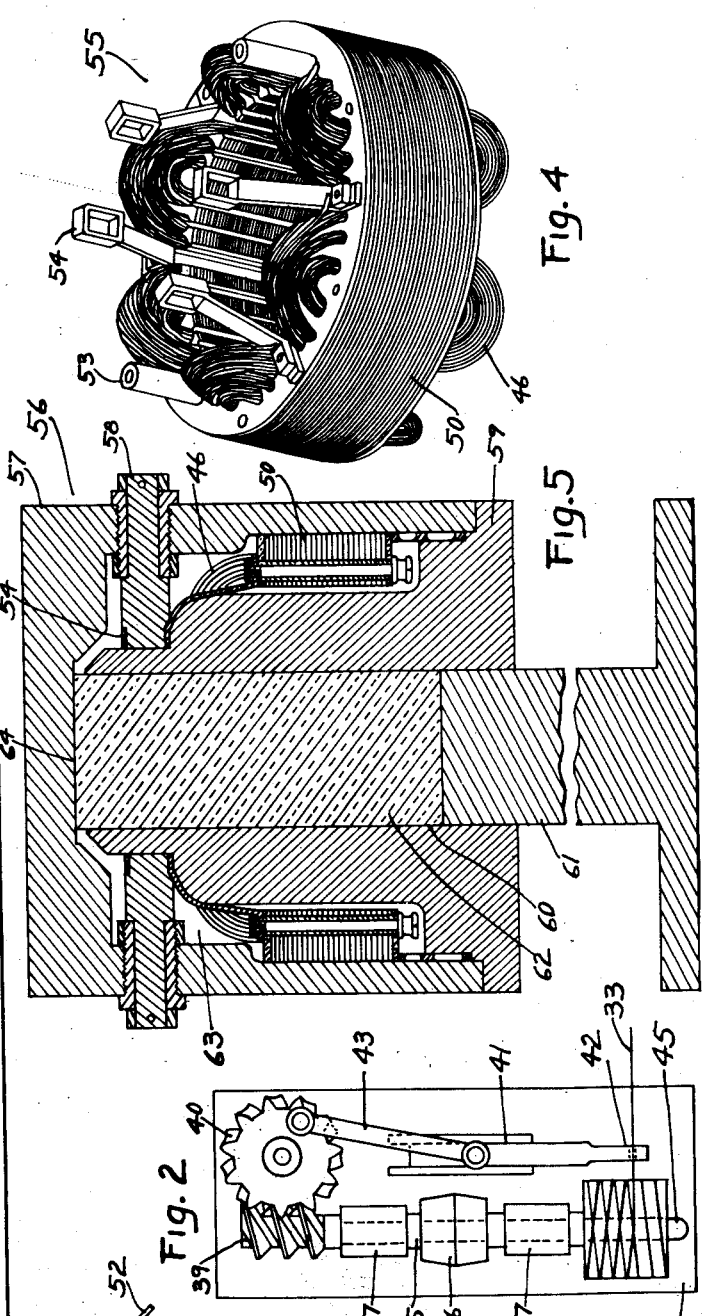
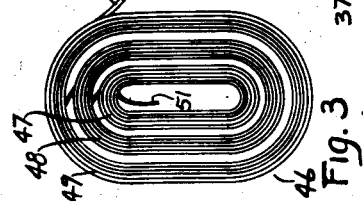
INVENTOR Patented Feb. 16, 1932

1,845,116

UNITED STATES PATENT OFFICE

VINCENT G. APPLE, OF DAYTON, OHIO

METHOD OF INSULATING COILS

Original application filed April 19, 1929, Serial No. 356,586. Divided and this application filed February 24, 1930. Serial No. 430,864.

This invention is a division of my copending application Serial Number 356,586 and relates to an improved method of insulating coils and has special reference to coils which are placed on, or about more or less complex structures of other materials.

An object of the invention is to insure more and better insulation between the individual turns of coils than has been possible by methods heretofore employed.

A second object is to provide means and a procedure which will carry out the first object with minimum expenditure of labor and material.

Another object is to provide a process and apparatus whereby the more or less porous covering of magnet wire may be saturated and coated with an accurately determined layer of suitable insulating material in liquid form and partially dried before it is wound into coils, to the end that there would be no excess of the liquid present which may get on the spool or core upon which the coil is placed, or on other surfaces of the structure, or in openings therein, where insulation would be objectionable and where its removal would present almost insurmountable difficulties after it became solid.

Another object is to employ insulating material of such a nature, and to so apply it between the turns of the coils as will provide a structure wherein the winding is capable of withstanding great abuse and considerable distortion, to the end that a layer of plastic insulation may be safely pressure molded thereabout without injury thereto when such a covering is deemed desirable.

That these and many other objects and meritorious features of the invention are attained by the procedure hereinafter outlined and described will be readily apparent to one skilled in the art from a consideration of the following description when taken in conjunction with the drawings which illustrate a dynamo electric machine field element made according to the principles involved in my invention.

In the drawings,

Fig. 1 shows apparatus for applying a coating of liquid insulation to a magnet wire which already has a covering of more or less porous insulation.

Fig. 2 shows apparatus for winding the wire on a temporary spool where it may become partially dry before it is wound into coils.

Fig. 3 shows a set of field coils wound from magnet wire treated by my process.

Fig. 4 shows six sets of the coils as they appear when they are in the field core, the core having secured thereto brush and line terminals to which the coil ends are joined.

Fig. 5 shows a mold within which the field structure shown in Fig. 4 is supported, there being sufficient additional space within the mold to receive a quantity of plastic insulation to form a cover or housing about the coils and terminals.

Similar numerals refer to similar parts throughout the several views.

In the construction of wound electrical devices which are intended to withstand any considerable electrical pressure it is the usual practice to wind the spools, or cores as the case may be, with conductive wire having a covering of more or less porous insulation, usually a fibrous material such as cotton, silk, asbestos, etc. and subsequently to immerse the wound core in a liquid insulating material and then apply pressure to the container to force the liquid to enter the porous covering of the wires and other interstices of the winding.

An objection to this method of insulating coils by impregnation is that often, after a coil is wound, and before it is impregnated with the liquid insulation, there are turns of the wire within the coil which are pressed so closely together, one turn against another, that the fibrous covering is almost, and sometimes quite, cut through, leaving adjacent turns in electrical contact, the condition occurring most frequently of course in a winding such as is employed on an armature, where many of the turns cross, one over the other.

Obviously, a sufficiently high pressure may force a liquid insulation to the innermost turns of the wound coil, but there is no reason to believe that any amount of pressure on the container will force the liquid to enter and spread apart those turns which are already in too intimate contact.

Another objection to the method of insulating wound devices by impregnation, is that in a great many cases the coils must be wound directly on the core, so that when afterward the coils are to be impregnated, the entire structure comprising the core, the coils and their terminals is necessarily immersed in the liquid insulation.

Now this would involve no great hardship in the case of a simple coil, but in a more complex structure, such for instance as the dynamo electric machine field element which I have selected to illustrate my invention, the liquid would cover the binding posts and brush terminals, would enter the central bore which must afterward clear an armature, and will penetrate and fill the bolt holes which extend longitudinally through the core, and while tools may be made to exclude the insulation from these parts while impregnation is being effected, there is afterward substantially as great difficulty in removing the surplus insulation from these tools as there would have been in removing it from the surfaces and holes of the wound element protected by them, for it is a well known fact that some of the best known liquid insulating materials have also the greatest adhesive properties.

Because they overcome the foregoing and many other objections to the conventional method of insulating coils, the hereinafter described procedure is considered of great value in the art.

The coating apparatus Fig. 1 has a base 10 upon which is mounted a tubular body 11, divided near its middle into two parts 12 and 13, the parts being held together by a threaded sleeve 14.

Body 11 is hollow, the space within being divided into two chambers 15 and 16 separated by a plug 17, which may be inserted and removed when the two parts 12 and 13 are separated by the removal of sleeve 14.

Plugs 18, held in place by screw caps 19, close the outer ends of chambers 15 and 16. Both plugs 18 as well as plug 17 have holes extending longitudinally therethrough, of a diameter equal to that of the wire to be coated. These plugs are preferably made from a material of a more or less yielding nature so as to permit the passage of a knot or a splice without undue strain on the wire. Cork has been found to be satisfactory both as to yielding qualities and as to wear, although a soft rubber plug having a small longitudinal split metal bushing imbedded at its center is equally desirable.

A tank 20 extends from body part 12 and communicates with chamber 15. Upon removal of filler plug 21 the tank may be partly filled with liquid insulation 22 as shown.

An air pump 23 has its discharge valve 24 connected by pipe 25 to tank 20 and its suction valve 26 connected by pipe 27 to chamber 16. The pump 23 is operated to create a partial vacuum in chamber 16 and pressure in the space 28 above the liquid 22 in tank 20.

A coil 29 of electrical resistance wire is suspended within, but does not touch chamber 16. The ends of coil 29 are brought out through insulating bushings 30 as shown. A second coil 31 is supported on metal brackets 32 extending from base 10. An electric current is made to flow through coils 29 and 31 when wire is being coated.

Magnet wire 33 comprising conductive wire covered with a thin layer of cotton or similar absorptive material is drawn from its spool 34 through one plug 18 into vacuum chamber 16 through coil 29 out of chamber 16 through plug 17 into the liquid insulation 22 in chamber 15 and out through the other plug 18 and coil 31.

When the wire 33 enters chamber 16, the partial vacuum, together with the heat generated by resistance coil 29, takes whatever moisture there may be from the porous cover, so that it enters chamber 15 dry, and with the pores of the fibrous covering under partial vacuum, and inasmuch as liquid 22 is under pressure it more readily penetrates all of the pores of the fibrous covering.

As the wire emerges from chamber 15 through plug 18 the surplus liquid is stripped off and retained in the chamber and the coating is given a definite size, depending of course on the accuracy maintained in the opening through plug 18. As the wire passes through heating coils 31, the liquid insulation is partly dried.

Whether the wire is now wound on a spool suitable for keeping it in storage, or whether it is wound directly on the cores or into finished coils, depends somewhat on the nature of the winding.

Where an electrical device is of such a nature as to require to be hand wound, or where the winding is more or less tedious and apt to take wire more slowly than it comes from the coating apparatus, or where it is simple and takes wire more rapidly than it can be coated, it may be advantageous to wind the wire into a storage coil.

It will of course be understood that when the wire comes from the heating coil 31, the liquid insulation is not completely baked out, yet it is dried sufficiently to make the coating tough and somewhat pliable, and it will of course be still slightly sticky, so that, in order to successfully store it, the reeling apparatus and the storage coil which it produces are necessarily of special construction.

The reeling apparatus Fig. 2 consists of a spindle 35 revolvable by pulley 36 in bearings 37 mounted on base 38. A worm 39 on the end of the spindle 35 drives wormwheel 40 whereby block 41 carrying wire guide 42 is reciprocated through connecting rod 43. Worm 39 preferably has multiple threads of coarse pitch and wormwheel 40 is preferably of small diameter and few teeth so that guide 42 may be reciprocated through a complete cycle in relatively few turns of spindle 35.

Because of this coarse pitch the wire is wound on the nose 45 of the spindle with wide space between turns and the turns of one layer crossing the turns of the layer beneath at considerable angle. Such a coil is commonly called a honey-comb coil, and is here wound in this shape, principally to prevent too great contact area and consequent adhesion between successive turns of a layer and between successive layers when the wire in unwound to be rewound into a permanent coil.

Fig. 3 shows permanent coil 46 wound in three interconnected parts 47, 48 and 49 which adapts it to a slotted core 50, Fig. 4, which I used for the field element herein selected for illustration, the beginning 51 of the inner section 47 being adapted to connect to one of the line terminals, and the end 52 of the outer section 49 being adapted to connect to one of the brush terminals.

Fig. 4 shows the field core 50 with six of the insulation treated coils 46 in place. Line terminals 53 and brush terminals 54 are insulated from the core though secured thereto by screws which pass through insulation lined holes in the core. The proper coil ends are electrically joined to terminals 53 and 54, as shown. The structure comprising core 50, coils 46, line terminals 53 and brush terminals 54 may be designated as a whole by numeral 55.

The structure 55 is now placed in a mold 56, Fig. 5, the essential parts of which are the outer body portion 57 having lateral pulls 58 which may be withdrawn from the completed molding to form brush pockets therein, the inner body portion 59 with the opening 60 passing therethrough and the plunger 61 snugly fitted to the opening 60. The opening 60 may be called the stock chamber since it holds the loose molding compound 62 prior to the molding operation and the space 63 between body portions 57 and 59 may be called the molding chamber since the stock 62 is compressed into it.

It will be seen that the stock chamber 60 shown with plunger 61 slightly entered, is in effect separate from the molding chamber 63, which is to form the finished housing, and that the end wall 64 of body portion 57 in effect forms a bottom for the stock chamber 60, so that movement of moldable material from the stock chamber 60 into the molding chamber 63 must be laterally of the movement of the plunger which forces the material out of the stock chamber into the molding chamber.

The reason for so constructing the mold and the manner of using it, is fully disclosed in my copending application Serial No. 267,782 filed April 5th, 1928, and consists briefly of placing the structure in the mold, heating the mold to a relatively high temperature, placing a measured quantity of the compound under the plunger 61, putting pressure on the plunger to force the unfluxed compound against the upper surface 64 of body portion 57, maintaining the pressure until the compound absorbs sufficient heat from the mold to become fluid and so flow laterally from under the plunger into the molding chamber 63 and there be compressed hydraulically about the coils and to the contour of the interior 63 of the molding chamber, then allowing the compound together with the insulation coating previously put about the individual turns of the coil to be hardened from the heat remaining in the mold.

Because of the manner in which the molding pressure comes on the winding, that is, substantially equal in all directions thereon, very little distortion of the coils results, and, because of the manner in which the individual turns of the winding are insulated, no ill effect results from such distortion of the coils as may occur.

The advantages of my improved method are numerous. First, the thickness of the insulation between turns of the coils is accurately controllable and does not depend on the space which may be left between turns of a coil which has been wound of cotton or similarly covered wire and afterward impregnated with a fluid insulation as in common practice; second, the liquid insulating material is conserved, since it is kept in a tightly closed receptacle while it is being applied to the wire, instead of in an open tank where a considerable portion is always lost by evaporation and consequent adhesion to the tank; and third, the liquid insulating material is not only placed where it will have the greatest effect but it is kept off of those portions where its presence would be objectionable, as on portions of the core and terminals, and from openings therein.

While it has been heretofore proposed to so impregnate and harden a wound coil as to enable it to resist distortion when a layer of plastic insulation is afterward molded thereabout, the herein described process comprises new steps whereby I succeed in so insulating the turns of a coil, one from another, that the distortion which results when the further step of molding a casing of plastic insulation is afterward taken is withstood with no ill effect, and while the entire method consists of a plurality of steps taken in a given sequence, with tools having a number of novel features, it will be apparent that methods comprising less than the entire number of steps indicated, and apparatus having less than the entire number of features, may in many cases be employed and will produce a new and useful result, for instance, on very small wire or where the covering on the wire is very porous, or when the liquid insulation is very thin, keeping pressure on the liquid, or passing the wire through vacuum, may be dispensed with, or when the wire is drawn through the coating apparatus very slowly the heating elements may be omitted, and while the preferred form of wound element comprises a jacket of plastic insulation molded about the pre-insulated coils, the structure 55 may be heated so that the liquid insulation on the wire composing the coils will be baked, whereupon the structure may be mounted in a separately made housing of molded insulation or of other material.

Holding this view of the scope of the invention,

I claim—

1. The method of making a coil from conducting wire having a porous covering, which consists of drawing the wire into and out of snug fitting openings in an otherwise closed receptacle containing liquid insulation, the wire passing through said insulation, applying pressure to the insulation within said receptacle as the wire passes through, applying heat to said wire after it comes from said receptacle to partly dry the insulation forced into said covering by said pressure, winding the wire into a coil, placing the coil into a mold, heating the mold to finish drying the insulation, then pressing a jacket of plastic insulation around the coil.

2. The method of making a coil for electrical use, from conducting wire having a covering of porous insulation, which consists of saturating and coating the porous covering with liquid insulation, winding the wire into a coil, placing the coil in a mold, heating the coil and mold together until the coating becomes a rigid mass, placing a measured quantity of plastic insulating compound in the heated mold, allowing it to soften from the heat of the mold, then compressing it about the rigid coil.

In testimony whereof I affix my signature.

VINCENT G. APPLE.